United States Patent
Havel et al.

(10) Patent No.: US 8,666,999 B2
(45) Date of Patent: Mar. 4, 2014

(54) SEARCH UTILITY PROGRAM FOR SOFTWARE DEVELOPERS

(75) Inventors: Ivan Havel, Prague (CZ); Marek Obitko, Kladno (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/196,547

(22) Filed: Aug. 2, 2011

(65) Prior Publication Data

US 2013/0036129 A1  Feb. 7, 2013

(51) Int. Cl.
  *G06F 17/30* (2006.01)
(52) U.S. Cl.
  USPC ........... 707/758; 717/100; 717/132; 717/155; 717/156
(58) Field of Classification Search
  USPC ........... 707/737, 756, 758; 717/124–158, 100
  See application file for complete search history.

(56) References Cited

U.S. PATENT DOCUMENTS

| | | | | |
|---|---|---|---|---|
| 5,551,055 | A * | 8/1996 | Matheny et al. | 710/62 |
| 5,889,999 | A * | 3/1999 | Breternitz et al. | 717/158 |
| 6,343,376 | B1 * | 1/2002 | Saxe et al. | 717/154 |
| 7,558,711 | B2 * | 7/2009 | Kodosky et al. | 703/2 |
| 2003/0208367 | A1 * | 11/2003 | Aizenbud-Reshef et al. | 705/1 |
| 2004/0154009 | A1 * | 8/2004 | Reynaud | 717/155 |
| 2005/0204344 | A1 * | 9/2005 | Shinomi | 717/124 |
| 2006/0036995 | A1 * | 2/2006 | Chickles et al. | 717/109 |
| 2006/0212432 | A1 * | 9/2006 | Tsai | 707/3 |
| 2007/0209074 | A1 * | 9/2007 | Coffman | 726/23 |
| 2009/0007087 | A1 * | 1/2009 | Ito et al. | 717/156 |
| 2009/0327279 | A1 * | 12/2009 | Adachi et al. | 707/5 |
| 2010/0083240 | A1 * | 4/2010 | Siman | 717/144 |
| 2010/0293080 | A1 * | 11/2010 | Shah | 705/34 |
| 2010/0293481 | A1 * | 11/2010 | Austin | 715/760 |
| 2010/0293483 | A1 * | 11/2010 | Austin et al. | 715/760 |
| 2010/0293521 | A1 * | 11/2010 | Austin et al. | 717/105 |
| 2010/0293522 | A1 * | 11/2010 | Cifra et al. | 717/105 |
| 2010/0293525 | A1 * | 11/2010 | Cifra | 717/109 |
| 2010/0293526 | A1 * | 11/2010 | Austin | 717/113 |
| 2010/0293527 | A1 * | 11/2010 | Austin et al. | 717/113 |
| 2010/0293528 | A1 * | 11/2010 | Austin et al. | 717/113 |
| 2010/0293529 | A1 * | 11/2010 | Austin et al. | 717/113 |
| 2012/0030646 | A1 * | 2/2012 | Ravindran et al. | 717/105 |
| 2012/0030647 | A1 * | 2/2012 | Wang et al. | 717/105 |
| 2012/0030648 | A1 * | 2/2012 | Correll | 717/105 |
| 2012/0030650 | A1 * | 2/2012 | Ravindran et al. | 717/107 |
| 2013/0014093 | A1 * | 1/2013 | Lee | 717/142 |

* cited by examiner

*Primary Examiner* — Hanh Thai
(74) *Attorney, Agent, or Firm* — Alexander R. Kuszewski; Boyle Fredrickson, S.C.; John M. Miller

(57) ABSTRACT

A search utility for industrial control programs accepts as a query an example program fragment which is abstracted into a graph-form capturing, for example, instruction control-flow and data-flow. This graph-form may be compared to a graph-form transformation of other portions of the program to provide a more sophisticated matching process that considers underlying logical hierarchy of the program elements rather than their superficial expression in the source code embodiment.

16 Claims, 10 Drawing Sheets

SEARCH UTILITY PROGRAM FOR SOFTWARE DEVELOPERS

STATEMENT REGARDING FEDERALLY SPONSORED RESEARCH OR DEVELOPMENT

- - -

CROSS REFERENCE TO RELATED APPLICATION

- - -

BACKGROUND OF THE INVENTION

The present invention relates to computer programs to assist in the preparation and maintenance of software and, in particular, to a search utility that may provide searches of computer programs based on an example fragment of a computer program.

Industrial controllers are special-purpose computers used for the real-time control of factory automation and the like. In operation, such controllers read a series of inputs from sensors associated with the automation and, based on an internal control program and those inputs, provide outputs to actuators controlling the automation.

In contrast to standard computers, industrial controllers are designed to be readily adaptable to a wide variety of different applications reflecting different control tasks. For this purpose, the hardware of industrial controllers is typically modular allowing changes in number and configurations of input and output circuits for communicating with the factory automation. High-speed and deterministic communication networks permit spatial distribution of the components of the industrial controller, including input and output modules providing the interface circuits, at a variety of locations consistent with their need to communicate with an industrial process that may occupy an entire factory.

Adapting an industrial controller to a specialized control task often requires the preparation of a custom program. For this reason, specialized control languages have been developed that simplify control program development including relay-ladder language (RLL) or structured block programming. These languages incorporate graphic elements (such as contacts or functional blocks) with text labels and a simplified control-flow to facilitate troubleshooting of the program.

The large capital investment represented by a typical factory and its industrial controllers normally requires operation of the factory over many years during which time maintenance of the control program will be required. To this end, software engineers may use search utilities to search through written control programs to help identify program elements that need revision or inspection during the maintenance process. Such search utilities generally look for a pattern in an underlying text version of the graphical programming languages. The search pattern may be expressed as a complex structural query, for example, using the SPARQL language, as disclosed in US patent application 2010/0153412 "User Interface and Methods for Building Structural Queries" filed Dec. 15, 2008 and US Patent Application 2010/0082669 "System and Method for Retrieving and Storing Industrial Data" filed Sep. 30, 2008, both assigned to the present assignee and hereby incorporated by reference. Such searches can be directed to any program element including a program instruction or data variable.

Such "expression" searches may be helpful in identifying everywhere a particular input variable or output variable is used in the control program. Expression searches may also be useful for identifying particular sequences of instructions, but formulation of the search query is difficult and this may deter usage of the utilities in this context.

SUMMARY OF THE INVENTION

The present invention provides a search utility that may search for program elements in a control program by example (e.g. a program fragment), rather than through the construction of a complex structural query. The search may consider not simply the program elements of the example, but also their logical hierarchy, for example the control-flow or data-flow through program elements of the example, or the spatial organization of display software objects such as buttons and other controls.

The ability to the search utility of the present invention to be aware of the logical hierarchy of program elements and to perform inexact matching permits the search utility to find program functions, for example, that may be consolidated for improved program efficiency, reduced size, and improved maintenance of the program. Accordingly, the search utility may be used in program development as well as program maintenance.

Specifically, the present invention provides a method, for example, using a computer program, to perform the steps of receiving from a user a computer program fragment including multiple program elements. The fragment is abstracted into a search graph capturing a logical hierarchy of program elements of the computer program fragment and matched against multiple corresponding target graphs capturing the logical hierarchy of program elements of different multiple portions of previously indexed computer programs. Several (possibly zero) of the multiple portions of the indexed computer programs having a target graph matching the search graph according to a predetermined matching condition is returned.

It is thus a feature of at least one embodiment of the invention to provide a simple method of identifying portions of a computer program that allow an example to be used in lieu of a complex search query. It is a further feature of at least one embodiment of the invention to provide a searching system that is aware of the underlying logical structure of the program.

The logical hierarchy may be a control-flow of the program elements describing the flow of program control among program elements and wherein the matching condition is a match of control-flow.

It is thus a feature of at least one embodiment of the invention to permit finding logically similar program portions regardless of variations in their expression in the computer language.

Alternatively or in addition, the logical hierarchy may be a data-flow of the program elements describing the flow of data among program elements.

It is thus a feature of at least one embodiment of the invention to allow logically similar program portions to be identified based on the path of data-flow through the program elements, again, regardless of variations in the expression in the computer language.

The search graph may further capture, in the vertices or edges, attributes such as tag names, variable names, instruction names, and instruction type (e.g. conditional instructions, read instructions, write instructions) and data types (e.g. Boolean, float).

It is thus a feature of at least one embodiment of the invention to permit attribute search terms to be searched for as well.

The method may include the step of providing to a user a search criteria input screen allowing the match condition to be selected to be limited to at least one of a matching of data-flow among program elements and attributes.

It is thus a feature of at least one embodiment of the invention to permit in different searches logical hierarchies to be selected as may be appropriate for different searches.

The method may include the step of providing to a user a search criteria input screen allowing selection of an exactitude of the matching condition.

It is thus a feature of at least one embodiment of the invention to permit inexact searches such as may reveal parallel structure from different program elements.

The computer program may be a relay ladder language program and the program fragment and program portions are sets of rung elements and the control-flow progresses through the rungs in a rung order and across the rungs from left to right. Alternatively, the computer program may be a human-machine interface (HMI) and the program fragment and program portions are sets of display objects and the logical hierarchy is spatial organization of the display objects on a display screen.

It is thus a feature of at least one embodiment of the invention to provide a search utility particularly suited for control programs.

The method may include the step of inputting the computer program fragment by selecting a portion of a display of the computer program on a graphics screen by means of a user interface device.

It is thus a feature of at least one embodiment of the invention to provide a rapid method of generating a search query.

The method may further include the step of clustering the return multiple portions of a computer program according to a cluster distance related to the logical hierarchy of the program elements.

It is thus a feature of at least one embodiment of the invention to permit a ranking of search results according to structural similarities.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

BRIEF DESCRIPTION OF THE FIGURES

FIG. 9 is a flow diagram showing use of the invention with cluster analysis for collecting search results for program analysis and the like.

DETAILED DESCRIPTION OF THE PREFERRED EMBODIMENT

Figure 1:
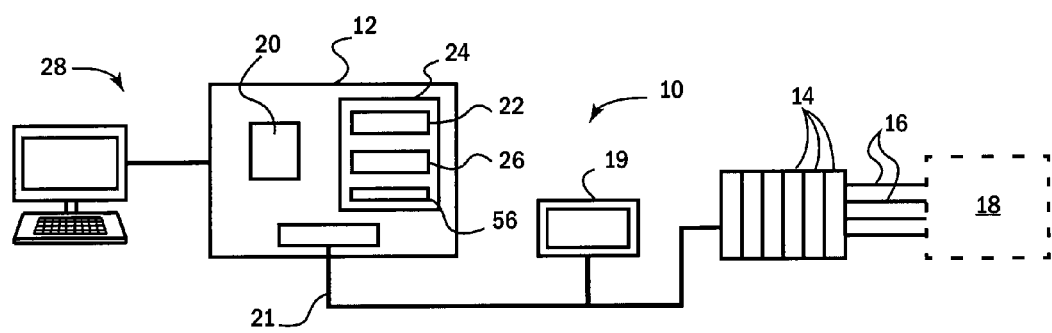
FIG. 1 is a simplified block diagram of an industrial controller suitable for use with the present invention.

Referring now to FIG. 1, an industrial control system 10 may employ an industrial controller 12 such as the programmable logic controller, communicating with one or more I/O modules 14 over a high-speed control network 21. The I/O modules 14, as is understood in the art, may provide for input and output lines 16 to industrial equipment 18, the output lines 16 providing signals to actuators used in the industrial equipment 18 and the input lines 16 receiving signals from sensors associated with the industrial equipment 18. The industrial controller 12 may further communicate over the high-speed control network 21 with one or more human machine interfaces (HMI) 19 that may display information about the operation of the industrial equipment 18 and its associated process. The high-speed deterministic control network 21, for example, may be well-known control networks such as such as Device Net, Control Net or Ethernet IP type networks.

The industrial controller 12 may include a processor 20 that may execute a stored program 22 contained in memory 24. The memory 24 may also include a utility search program 26 of the present invention and an index database 56 as will be described below.

The industrial controller 12 may also communicate with a standard programming terminal 28 that may accept user commands, for example, using a keyboard and mouse, and output data, for example depictions of the program 22 and search results from the search program 26 of the present invention, by a graphics monitor.

Figure 2:
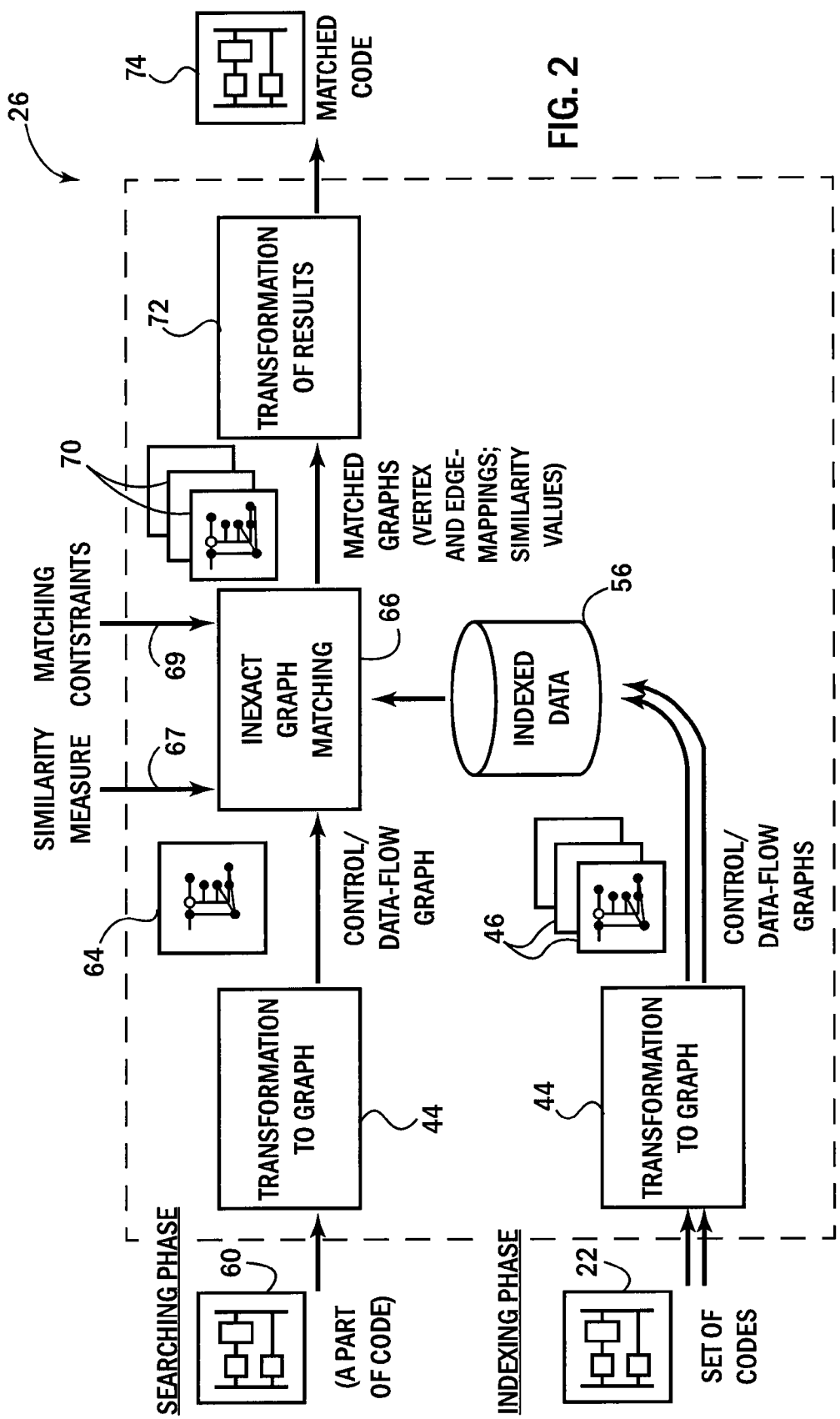
FIG. 2 is a flow chart showing principal steps of the present invention.

Referring now to FIG. 2, the program 26 may receive as an input an image of the control program 22, the latter generally made up of program elements such as instructions, variable names, objects and the like. In a first example, in which the program 22 is written in relay ladder language (RLL), the program 22 may be comprised of program elements including rungs and various contacts, coils, and function blocks as are generally understood in the art.

Figure 3:
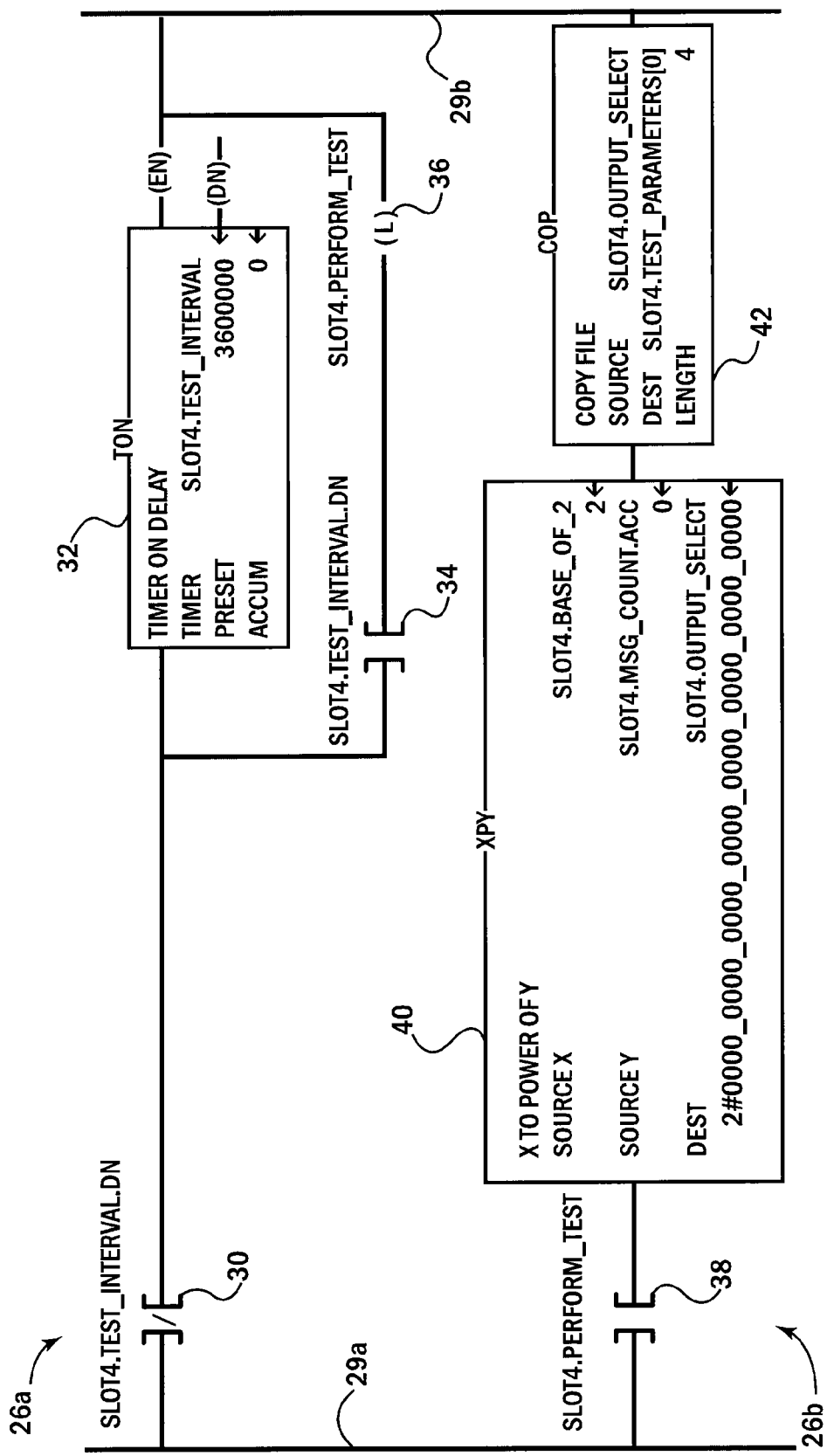
FIG. 3 is an example program fragment of various rung elements in a relay ladder language (RLL) that may be used by the present invention in generating a search.

Referring momentarily to FIG. 3, an example portion of such a program 22, depicted in conventional graphic form, may provide for a first rung 26a and a second rung 26b one above the other and extending between a symbolic positive and ground rail 29a and 29b in the manner of the conventional relay structure. In this example, the first rung 26a provides a normally closed (XIO) contact element 30 which when closed may provide power to an on timer 32 (TON) and a series connected normally open contact 34 (XIC) and output coil 36 (OTE), with the latter two connected in parallel with the contact element 30. The second rung 26b provides a normally open contact 38 (XIC) in series with an arithmetic exponentiation block 40 (XPY) and a copy file block 42 (COP).

Referring again to FIG. 2, as indicated by transformation block 44, a set of programs 22 (such as RLL and/or HMI programs) is processed to transform multiple portions (typically routines of the RLL programs or screens of the HMI programs) of the program 22 into corresponding target graphs 46 in a common graph-form 47 as will be described in more detail below. The target graphs 46 may be stored as indexed data in the index database 56 in memory 24 managed by the search program 26. The index database 56 may link the target graphs 46 to their locations in the original program 22 to permit the source code (e.g., RLL code) for each target graph 46 to be quickly identified later as will be described.

Figure 5:
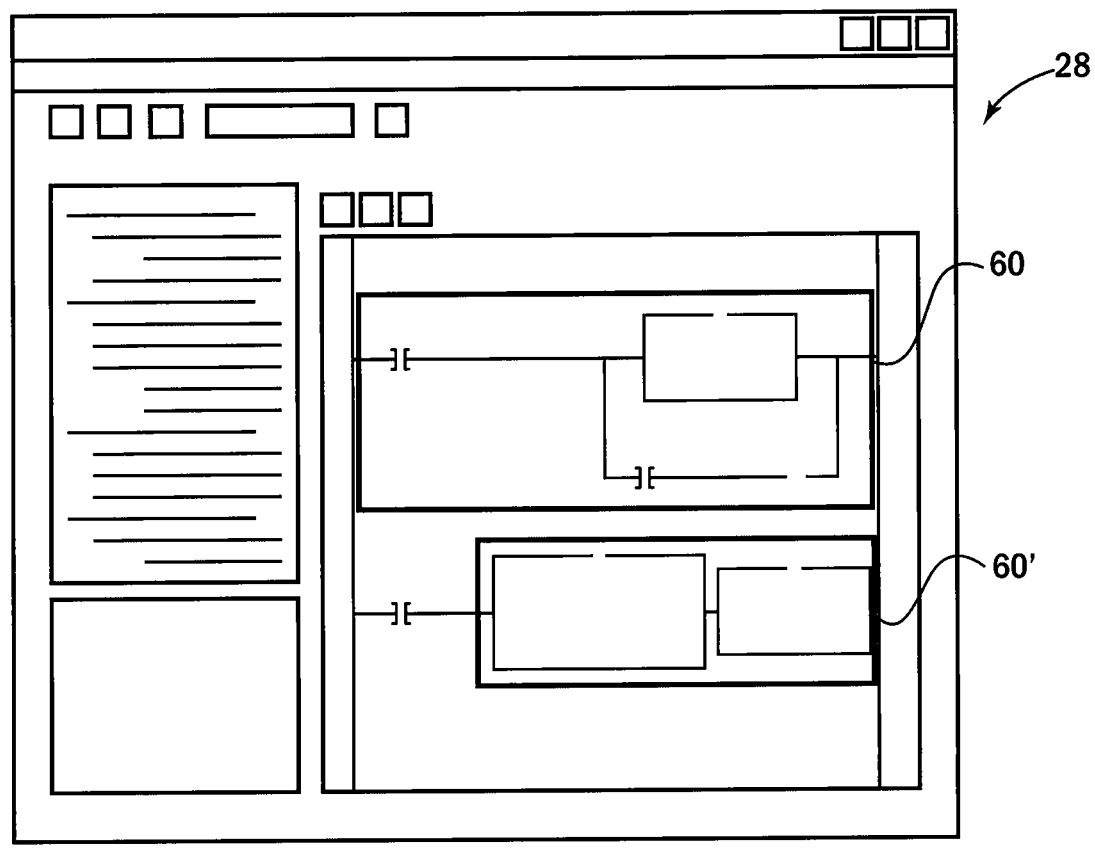
FIG. 5 is a depiction of a computer screen showing the selection of a program fragment of contiguous or noncontiguous elements.

Referring now to FIG. 2, after an indexing of the program 22, a search may be conducted in which a program fragment 60 may be identified consisting of various program elements. Referring now to FIG. 5, in one embodiment particularly useful in a graphic programming language, the program fragment 60 may be identified by the programmer by simply highlighting a portion of the program 22 as represented graphically on the monitor of the terminal 28. The program fragment 60 may be a single contiguous block in the graphical representation of the program 22 or may be multiple discontinuous blocks represented by program fragments 60 and 60'.

Referring again to FIG. 2, program fragment 60 is transformed per transformation block 44 into a search graph 64 also in the common graph-form 47 to provide an effective search query for other similar fragments within the set of programs 22.

Figure 4:
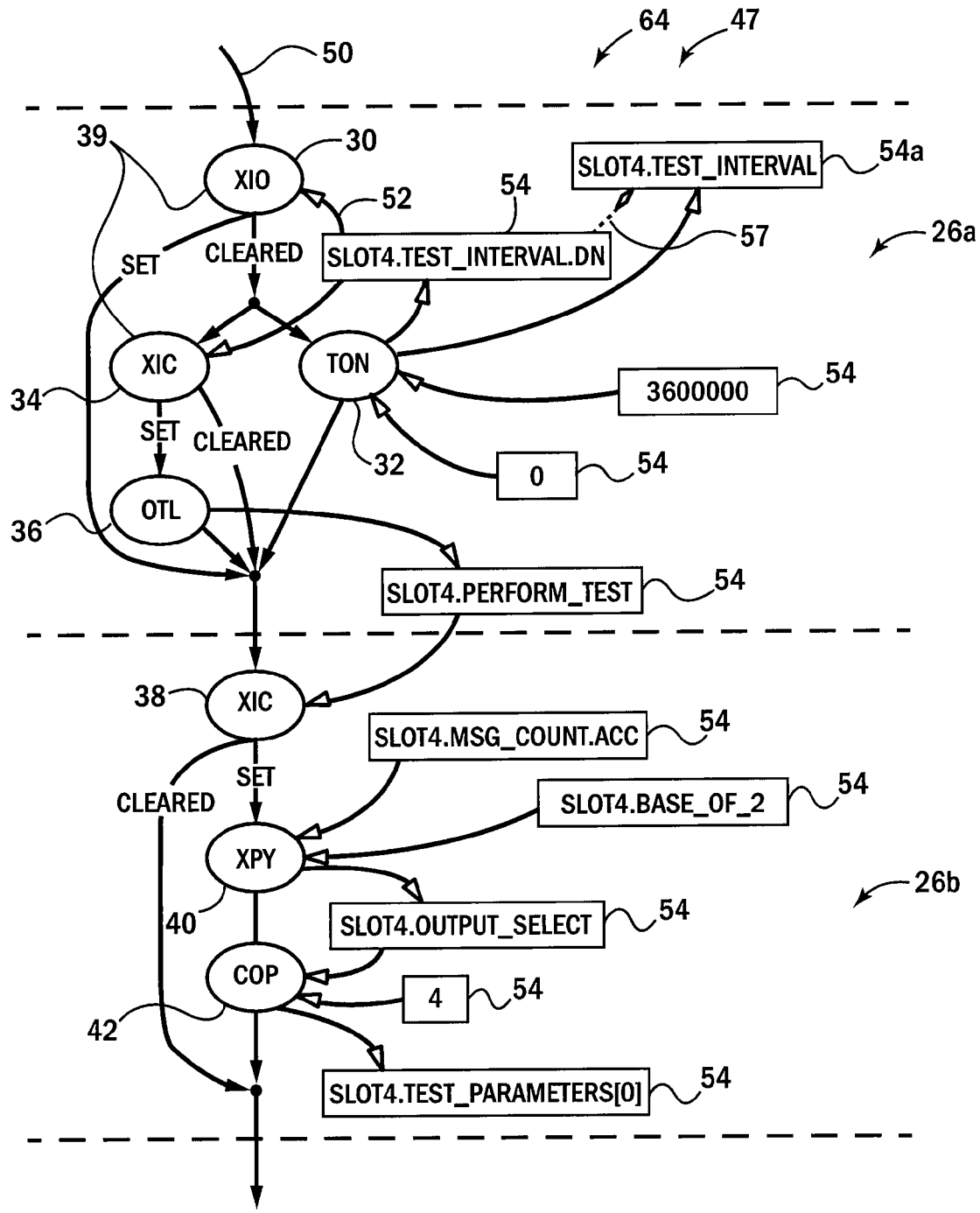
FIG. 4 is a transformation of the program fragment of FIG. 3 into a search graph capturing data-flow and control-flow such as may be used in the search of the present invention.

The particular common graph-form 47 is preferably that of an attributed relational graph. Such graphs provide labels or properties both to the vertices and to the edges connecting vertices. Referring now to FIG. 4, in one embodiment, the transformation block 44 produces graphs having first vertices 39 that are the rung instructions (e.g. XIC, XIO, TON, etc) shown as ovals in FIG. 4 and second vertices 54 that are the data operated on or produced by the rung instructions (e.g., Slot4. Test_Interval) shown by rectangles. In this case, the vertex labels describe the instruction names or data names as described above. Additional attributes (not shown in the figure) may be associated with the vertices and edges, such as instruction category, data type, etc. described above.

The edge labels in turn are used to describe a "logical hierarchy" of the vertices 39 and 54, and in this example, the logical hierarchy of the control-flow among the vertices 39 of the instructions (depicted by arrows with darkened arrowheads) and the data-flow among the vertices 39 of the instructions as the program 22 as executed (depicted by arrows with open arrowheads). The control-flow within the program 22 will generally follow the rungs from top to bottom and from left to right. The data-flow will show where data is generated (or initialized) at vertices 54 and consumed at a vertices 39. As will be discussed below, the edges may alternatively provide for a spatial hierarchy with respect to graphics objects on an HMI or the grouping hierarchy of those elements.

Referring still to FIG. 4, an example graphic representation of the program portion of FIG. 3 may map the instruction elements 30, 32, 34, 36, 38, 40 and 42 to vertices 39 connected by control-flow edges 50 generally following the control-flow depicted by the rungs of FIG. 3. Instructions such as XIO 30, for example, have two control-flow edges extending from its vertex 39 representing the different control-flow paths determined by two different binary states of evaluation of the instruction. The flow of data not provided in the graphical form of the source code of the program fragment 60 or program 22 maps data variables such as "Slot4. Test_Interval.DN" to particular vertices 39 (e.g. instruction 30 and instruction 34) both of which consume this particular data as operand, and to instruction 32 which generates the value of this data variable.

Optionally, a hierarchy of data variables (e.g. parent-child relationships) may also be mapped in the common graph-form 47. For example, the parent/child relationship between "Slot4. Test_Interval" and "Slot4. Test_Interval.DN" may be depicted by an edge 57 (dotted line with a double arrowhead). This hierarchy may also be captured by the graph and used for the search process.

Generally, these graph-forms including the vertices and edges may be encoded in a text string or similar data structure (typically as lists or tables) as will be understood to those of ordinary skill in the art and need not be displayed as such.

In this example, the common graph-form 47 provides "precedent relationships" describing control-flow within a program portion, "data-propagation relationships" describing where specific data is generated and consumed, and "composition relationships" or attribute relationships describing the names of the instructions and data variables. The invention, however, contemplates that a subset of these relationships may also be employed. The encoding of these relationships will generally be different from the encoding in the relay ladder language program 22 and the program fragment 60, which are also in the form of graph. Generally, the transformation block 44 will be used to transform any source code, graph-form or otherwise, into a common graph-form 47 revealing these desired relationships.

Referring again to FIG. 2, at process block 66, a matching process may be used to identify target graph's 46 portions that match the program fragment 60. Because graph-forms 47 are compared, this matching process considers not simply the adjacency of the program elements (e.g. instructions within the program 22) as expressed in the program 22 but the logical equivalence of the program elements with respect to a logical hierarchy represented either by the precedence relationship, the data propagation relation or the compositional relationship described above which may differ markedly from the adjacency within the program 22 in source code form.

The matching process block 66 may use any of a number of existing graph comparison engines, for example, graph comparison engines such as GraphGrep described in D. Sasha, J. T. L. Wang, and R. Giugno, Algorithmics and Applications of Tree and Graph Searching, Proceedings of the 21st ACM SIGMOD-SIGACT-SIGART Symposium On Principles Of Database Systems, 21:39-50 2, (2002); Daylight described in C. A. James, T. Weininger, and the J. Delany, Daylight Theory Manual 2008, or Cytoscape an open-source platform for complex-network analysis and visualization http://www.cytoscape.org.

Alternatively a frequent structure-based approach may be used such as may be provided by gIndex described in X. Yan, P. S. Yu, and J. Han in "Graph Indexing: A Frequent Structure-Based Approach, Proceedings of the 2004 ACM SIGMOD International Conference On Management Of Data, pages 335-346, 2004.

Generally, each of these techniques will provide a quantitative indication of the exactitude of the match between graphs compared. In this regard, as shown in FIG. 2, the matching process block 66 may receive a similarity measure 67 which is not a value but a method of evaluating graph-to-graph similarity (taking account of both graph structure and vertex/edge attributes, e.g. by computing graph-edit-distance, among other steps), and matching constraints 69 which generally indicate the required parameters of the actual match, including whether it should be exact or inexact, what relations and attributes are considered for matching (or to what extend for the inexact match); it also contains the similarity threshold, necessary value of the similarity measure in order for the algorithm to indicate an inexact match. The elements of the similarity measure 67 and/or matching constraints 69 will generally define what will be termed the "exactitude" of the match.

Referring still to FIG. 2, matched graphs 70 from the target graphs 46 may then be transformed as indicated by process block 72 back into the particular source code representation underlying those matched graphs 70 to produce zero or more output matches 74 which may be displayed, for example, sequentially or in a list in the manner of typical search results. This transformation of process block 72 may simply refer to the index database 56 to identify the original portion of the program 22 mapping to the matched graphs 70 or the source code of the output matches 74 may be reconstructed by a reverse transformation similar to that performed at transformation block 44, albeit in reverse. In one output technique, the output matches 74 may be highlighted in the original program 22 to provide for their context.

Figure 7:
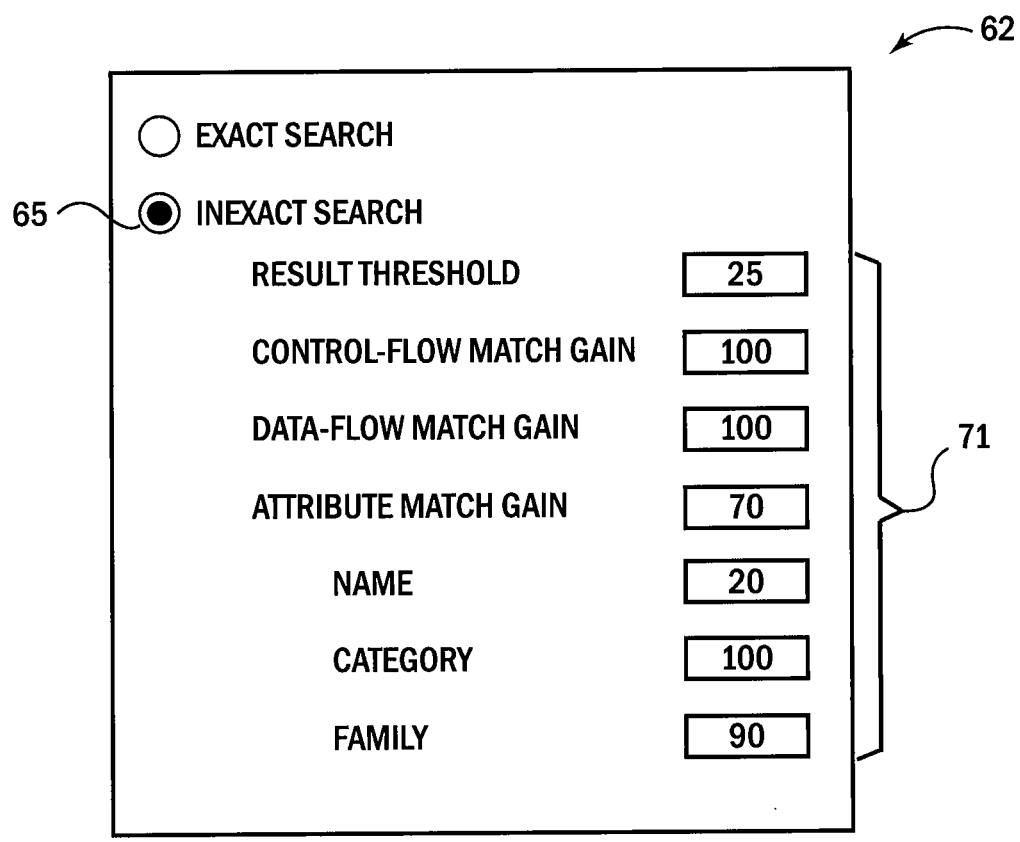
FIG. 7 is a screenshot of a user control used to input a degree of matching required in the search.

Referring now to FIG. 7, the user may select the elements of the exactitude of the matching process of process block 66, to provide selected elements of one or both of the similarity measure 67 and the matching constraints 69 through a screen 62 displayed on terminal 28 and providing input from that screen 62 to process block 66 of the program 22. This example is not intended to be exhaustive.

If an exact match is not required, the "inexact" radio button 65 may be selected and particular parameters 71 may be entered indicating a threshold for acceptable matches, the parameters of the match (e.g., control-flow, data-flow, or attribute), and weights for each parameter in that threshold. For example, with the result threshold of 25, no match whose total reading of less than 25 will be selected for the output matched graphs 70. This total reading may be produced by a composition of the quality of the match for each parameter (produced by the selected algorithm of the matching block 66) as weighted by the by the user-entered parameter 71. Similarly, in an evaluation of the control-flow match, the data-flow match may equally be restrained in this case to a normalized value of a hundred equaling a perfect match. Generally the quality of the match provided by the algorithm will look at how well the structure of the search graph 64 match with a particular target graph 46 together with attribute correspondence of the matched objects (vertices and edges).

Figure 8:
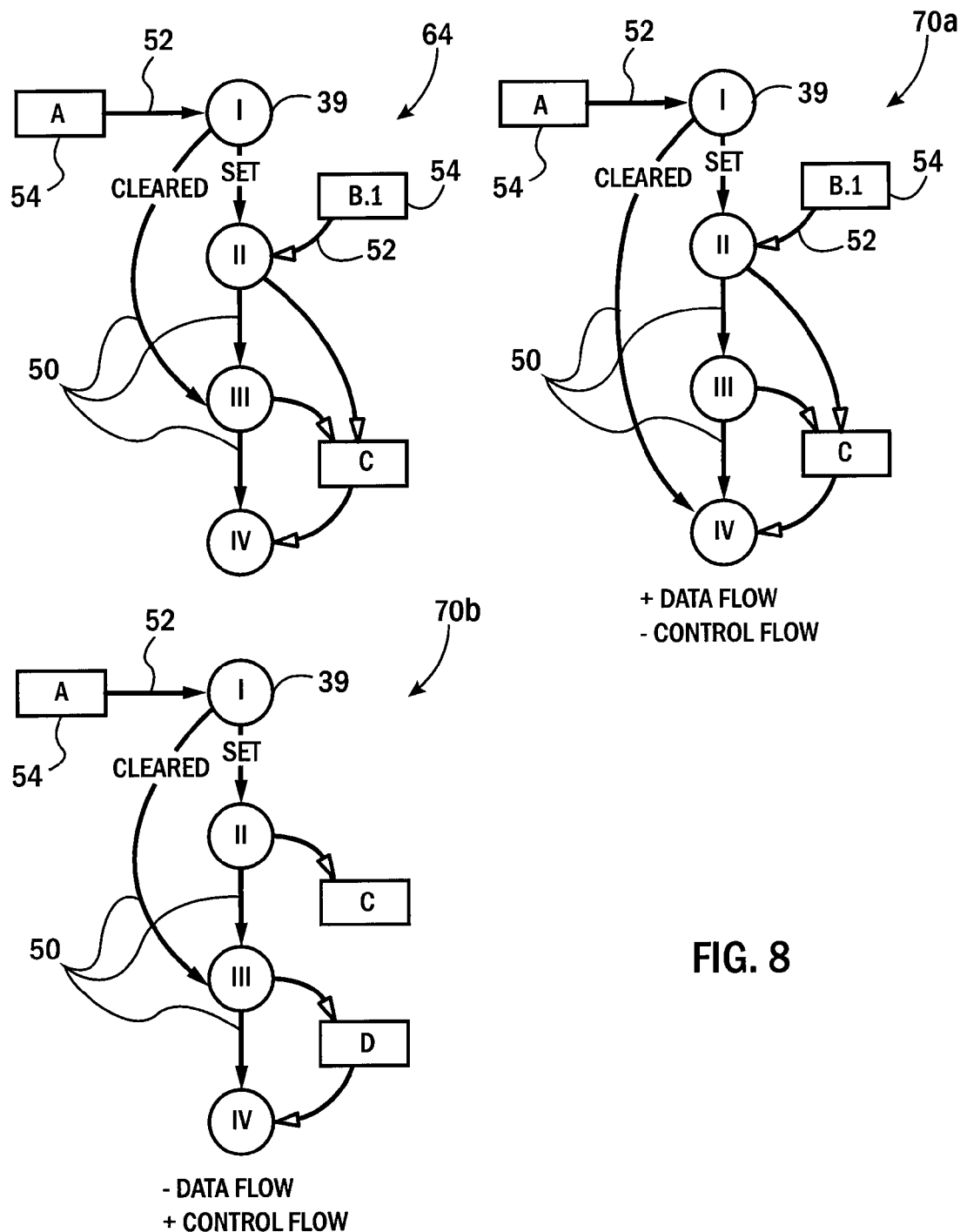
FIG. 8 is a simplified representation of different search results obtained with different matching constraints.
Figure 9:
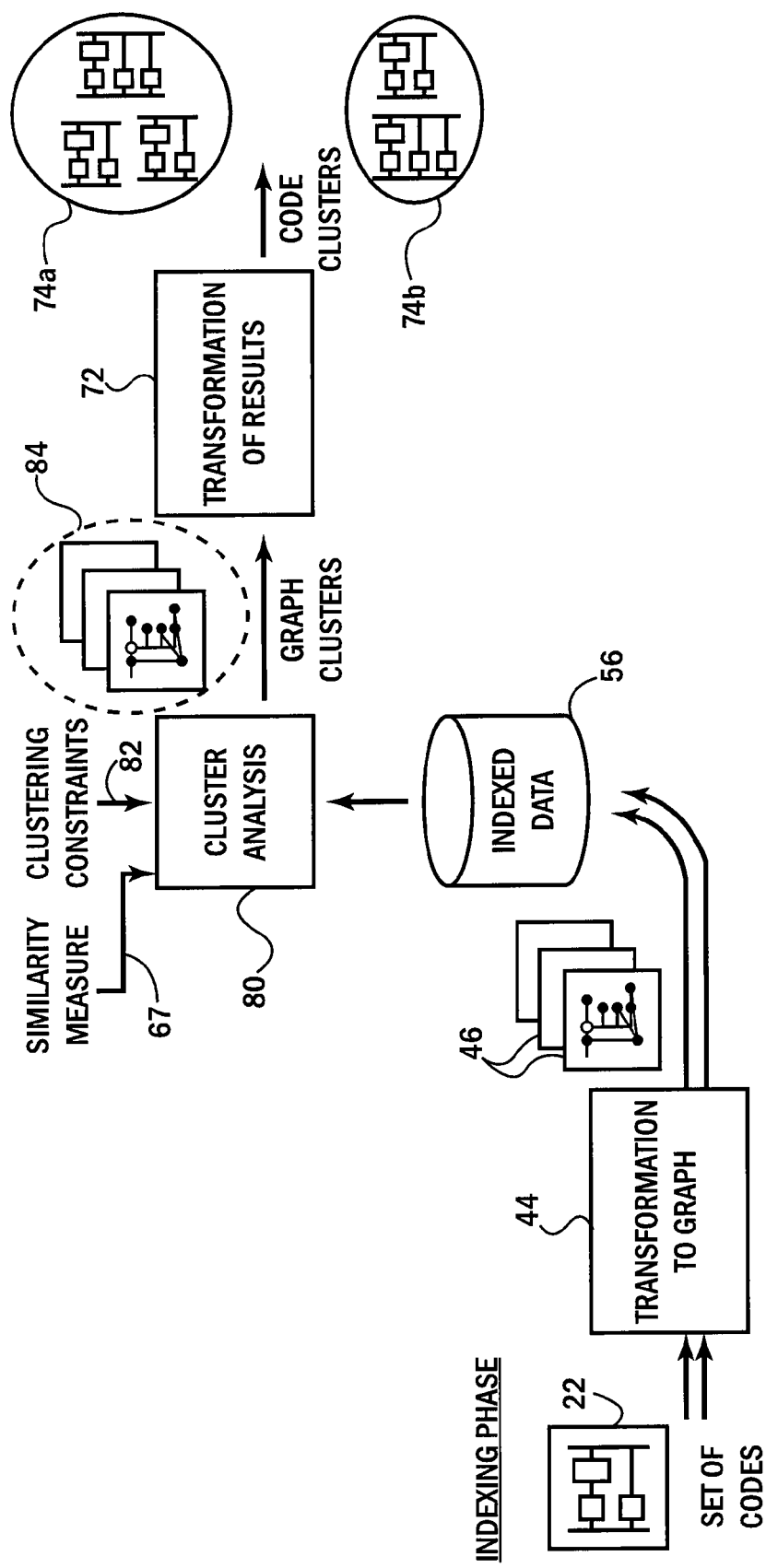

Referring now to FIG. 8, a search graph 64 may provide, for example, three vertices I-III having defined control-flow edges 50, data-flow edges 52, and data items (i.e. variables/tags, values) (A, B.1 and C). A selection of high weighting for data-flow match but low weighting for control-flow match may produce matched graphs 70a, for example, providing the identical vertices I-III with the identical control-flow edges 50, and the identical compositional values (A, B.1 and C) but with a different data-flow. In this example, compositional values A, B.1 in matched graphs 70a provide data-flow to vertex element II, rather than III (as in search graph 64), and vertex element II in matched graphs 70a outputs the compositional value C instead of I.

Alternatively, a high weighting of data-flow and control-flow in the match may be requested with a low weighting for the attribute match which will identify fragments such as matched graphs 70b having the same data-flow edges 52 and control-flow edges 50 as the search graph 64 but with slightly different data items, for example A.2 instead of A, and D instead of C.

Figure 6:
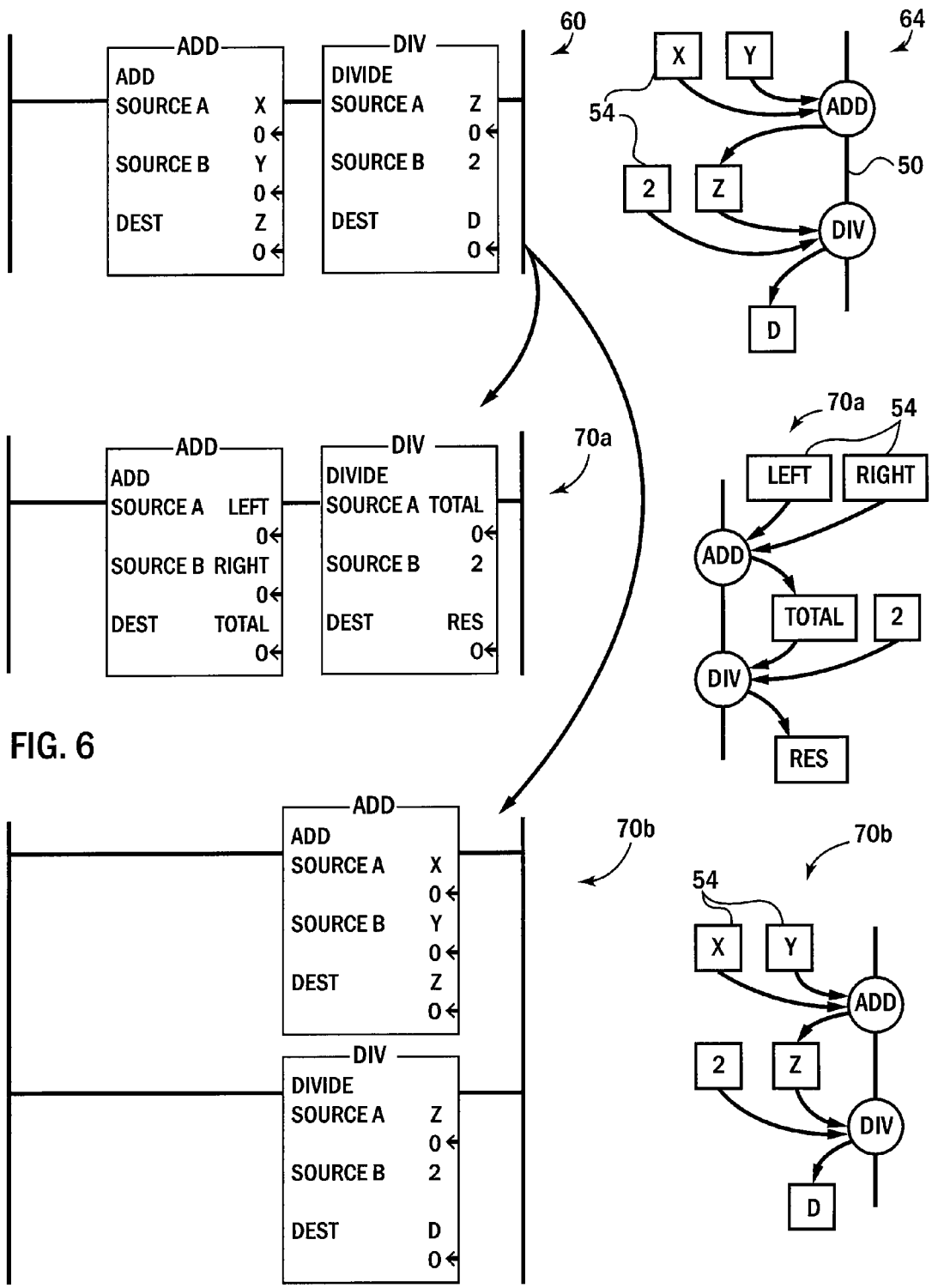
FIG. 6 is a simplified example of results obtained by a search that considers a logical hierarchy of control-flow in the matching process.

Referring now to FIG. 6, it will be appreciated that the transformation to a common graph-form 47 allows matching of program portions that may better reflect underlying control-flow and data-flow without influencing expressional differences. Thus, for example, the simple rung program fragment 60 having an add function followed by a divide function in a single rung can be matched to both matched graph 70a, identical to program fragment 60, and matched graph 70b in which the add instruction and divide instructions are placed on separate rungs, a difference in expression but not in function. This matching of deeper structure may help identify code portions that would otherwise be overlooked. The matching of the control flow may be exclusive of matching the data attributes (per matched graph 70a) from or include matching of the data attributes or dataflow (per matched graph 70b).

On the other hand, it will be understood that adopting a different common graph-form 47 may permit distinguishing these two matched graphs 70a and 70b, for example, by adding the beginning of a rung as a vertex in the common graph-form 47.

Referring now to FIG. 8, the technique of the present invention may also be used for analyzing and refining program structure. As before, the program 22 may be transformed into target graphs 46 by transformation block 44 and stored in index database 56. The index database 56 may then be analyzed by a cluster analyzer 80 to find portions of the program 22 that are similar according to various graph features of control-flow, data-flow, and compositional relations (or spatial or grouping features as will be described below with respect to HMI programs). As before, similarity measure 67 is used to evaluate the degree of similarity within one cluster and among clusters. The clustering constraints 82, for example, may describe the size of the desired cluster elements in terms, for example, of the numbers of instructions in each target graph 46 and hence each cluster. Cluster analysis is generally known in the art and involves separating sets according to a generated mathematical distance of the set elements. This distance may relate to an inter-cluster/intra-cluster distance. In this case, the mathematical distance is the value computed by the selected similarity measure method (described earlier) taking into account the structural and attribute features of the graphs. Other methods of generating the required distance are also contemplated.

The clustered results in graph-form 84 may then be transformed by process block 72 to provide an output of the code clusters 74a and 74b. These output code clusters 74a and 74b may be analyzed by the programmer to see if repeated similar elements in the program 22 can be rationalized, for example, as a single routine or subroutine or function call.

Figure 10:
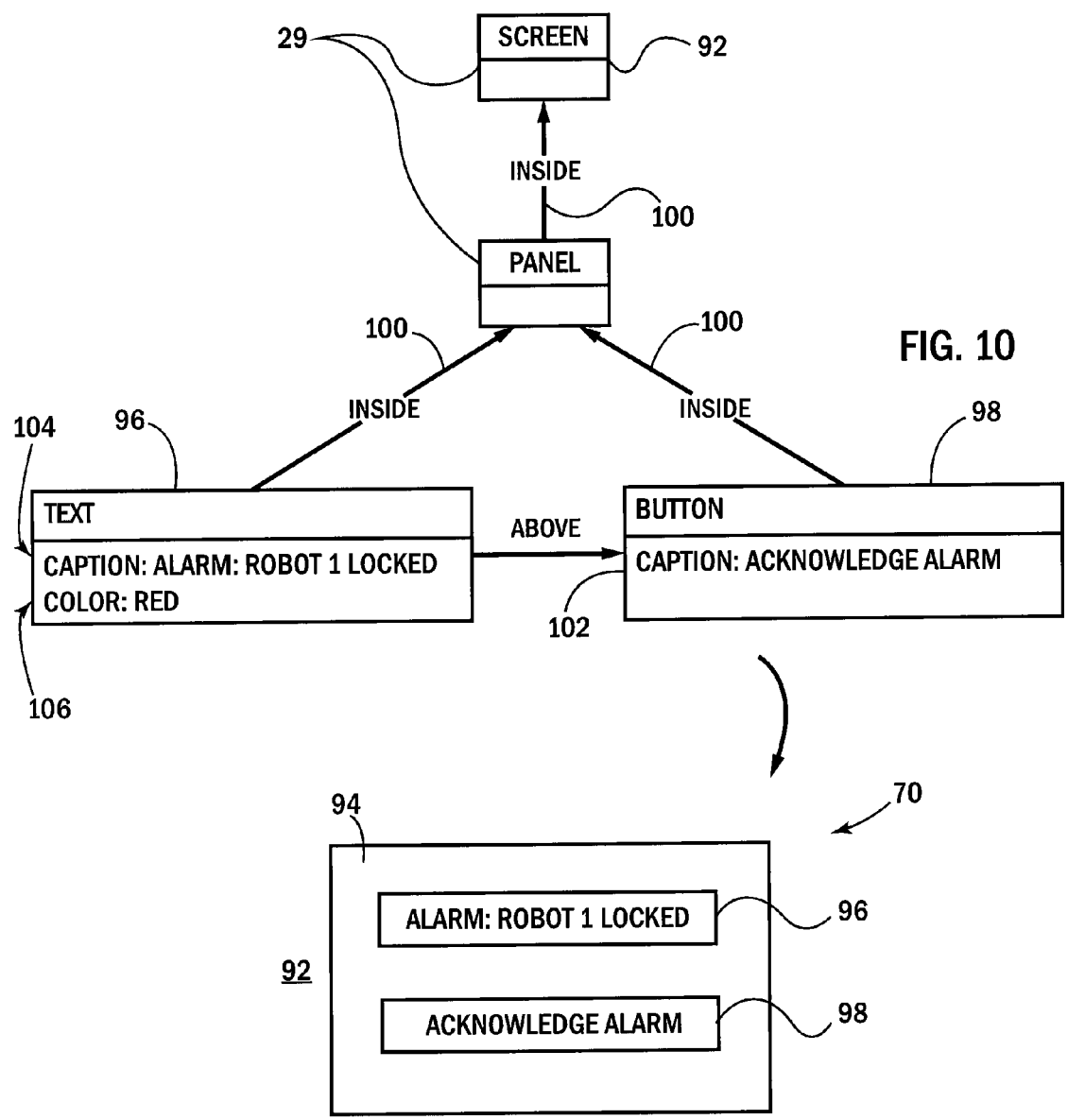
FIG. 10 is an example of use of the present invention applied to graphical objects in a program of a human-machine interface (HMI).

Referring now to FIG. 10 the logical hierarchy captured by the graphs described above and, in particular, the data propagation relationship and control-flow relationship can be easily generalized to other logical hierarchies inherent in the control program. In particular, graphical objects used to generate displays on the display screen of the HMI 15 may be similarly converted to a common graph-form 47. In this regard, in a manner analogous to that described above, the user may provide a program fragment 90 by highlighting elements of an HMI screen 92 implemented by underlying software objects. For example, an HMI display may have a displayed panel 94 holding a text block 96 and a button 98 of the type that may be activated by a mouse or screen touch. This highlighted image may be abstracted into a search graph 64 by a transformation block 44 in which the graphical elements form vertices 29 linked by spatial relationship edges 100 analogous to the control-flow edges 50 described above. For example, these edges may indicate that the panel 94 is "inside" the screen 92, and that the text block 96 and button 98 are "inside" the panel 94 and that the text block 96 is "above" the button 98.

In addition to spatial organization of HMI objects, there is also a possibility of a graphing logical organization—for example, a label and button may be grouped to one group "Alarm" and the visibility of the whole group may be controlled by a single data item. This may be made in the visible form of Panel (as illustrated in the FIG. 10) or the group may be invisible to the user—the grouping is only logical, not spatial (objects inside such a group may be anywhere on the screen). In this case the edges may indicate this logical grouping.

The graphical objects may produce/consume data items in a similar way as instructions in RLL do. In fact, the graphs may be mixed together, e.g. an RLL instruction computes a value stored in a tag which is used by a graphical element within an HMI form.

Object parameters such as the text of the caption of the button 102, or the text 104 of the text block 96 and the color of the text 106 may provide data-flow edges 110 analogous to the data-flow edges 52 described above.

Output matched graphs 70 may thus be obtained in a search using the search graph 64 identifying a similar HMI layout matching the search graph 64 although visually somewhat different in the actual location of the panel within the screen and the text block and button within the panel.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be constructed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A method of identifying portions of a computer program comprising the steps of:
    (a) receiving from a user a computer program fragment including multiple program elements including at least one instruction controlling the operation of a processor in a controller;
    (b) abstracting the computer program fragment into a search graph capturing a logical hierarchy of program elements based at least in part on the at least one instruction program element of the computer program fragment;
    (c) matching the search graph against multiple corresponding target graphs capturing the logical hierarchy of program elements of different multiple portions of the computer program;
    (d) returning at least one of the multiple portions of the computer program having a target graph matching at least a portion of the search graph according to a predetermined matching condition,
    wherein the logical hierarchy is a control-flow of the program elements describing the flow of program control among program elements and wherein the matching condition is a match of control-flow, and
    wherein the logical hierarchy is a data-flow of the program elements describing the flow of data among program elements.

2. The method of claim 1 wherein the search graph further captures program element attributes selected from the group consisting of: tag names, variable names, instruction names, and instruction type.

3. The method of claim 2 including the step of providing to a user a search criteria input screen allowing the match condition to be selected to be limited to at least one of a matching of data-flow among program elements and the selected set of program element attributes.

4. The method of claim 1 including the step of providing to a user a search criteria input screen allowing selection of an exactitude of the matching condition.

5. The method of claim 1 wherein a computer program is a relay ladder language program, and the program fragment and program portions are sets of rungs and the control-flow progresses through rungs in a rung order and across the rungs from left to right.

6. The method of claim 1 wherein the computer program is a human-machine interface (HMI) and the program fragment and program portions are sets of display objects and the logical hierarchy is at least one of a spatial organization and logical grouping of the display objects on a display screen.

7. The method of claim 1 wherein the computer program is a combination of a relay ladder language program comprised of rung instructions and a human-machine interface (HMI) of sets of display objects, and the program fragment and program portions are sets of rungs and sets of display objects, and the logical hierarchy is a control-flow through the rungs and at least one of a spatial organization and logical grouping of the display objects on a display screen.

8. The method of claim 1 including the step of inputting the computer program fragment by selecting a portion of a display of the computer program on a graphics screen by means of a user interface device.

9. The method of claim 8 wherein the portion is a contiguous portion of the computer program.

10. A method of identifying similar portions of a computer program comprising the steps of:
(a) abstracting the computer program into multiple graphs capturing a logical hierarchy of program elements based at least in part on instructions in each program element of the computer program;
(b) clustering the multiple graphs according to a cluster distance related to the logical hierarchy of the program;
(c) outputting the program elements of each graph grouped according to the clustering of their corresponding graphs,
wherein the logical hierarchy is a control-flow of the program elements describing the flow of program control among program elements and wherein the cluster condition is a clustering of control-flow, and
wherein the logical hierarchy is a data-flow of the program elements describing the flow of data among program elements.

11. A computer program fixed in a non-transitory computer-readable medium for execution on electronic computer to implement the steps of:
(a) receiving from a user a computer program fragment including multiple program elements including at least one instruction controlling the operation of a processor in a controller;
(b) abstracting the computer program fragment into a search graph capturing a control-flow of program elements based at least in part on the at least one instruction program element of the computer program fragment;
(c) matching the search graph against multiple corresponding target graphs capturing the control-flow of program elements of different multiple portions of the computer program;
(d) returning at least one of the multiple portions of the computer program having a target graph matching the search graph according to a predetermined matching condition,
wherein the control-flow of the program elements describes the flow of program control among program elements and wherein the matching condition is a match of control-flow, and
wherein the control-flow is a data-flow of the program elements describing the flow of data among program elements.

12. The computer program of claim 11 wherein the search graph further captures attributes.

13. The computer program of claim 12 including the step of providing to a user a search criteria input screen allowing the match condition to be selected to be limited to at least one of a matching of data-flow among program elements, selected attributes, and match exactness.

14. The computer program of claim 11 wherein a computer program is selected from the group consisting of a relay ladder language program and a human-machine interface (HMI) wherein the program fragment and program portions are sets of rung elements and display objects on a display screen respectively.

15. The computer program of claim 11 including the step of inputting the computer program fragment by selecting a portion of a display of the computer program on a screen by means of a user interface device.

16. The computer program of claim 11 further including the step of clustering returned multiple portions of a computer program, according to a cluster distance related to a matching of the control-flow of the program elements and their attribute conformity.

* * * * *